United States Patent
Sudou

(10) Patent No.: US 10,112,619 B2
(45) Date of Patent: Oct. 30, 2018

(54) TIRE MANAGEMENT SYSTEM AND TIRE MANAGEMENT METHOD

(71) Applicant: Komatsu Ltd., Tokyo (JP)

(72) Inventor: Tsugio Sudou, Kanagawa (JP)

(73) Assignee: Komatsu Ltd., Tokyo (JP)

( * ) Notice: Subject to any disclaimer, the term of this patent is extended or adjusted under 35 U.S.C. 154(b) by 47 days.

(21) Appl. No.: 15/021,756

(22) PCT Filed: Sep. 20, 2013

(86) PCT No.: PCT/JP2013/075502
§ 371 (c)(1),
(2) Date: Mar. 14, 2016

(87) PCT Pub. No.: WO2015/040744
PCT Pub. Date: Mar. 26, 2015

(65) Prior Publication Data
US 2016/0221582 A1    Aug. 4, 2016

(51) Int. Cl.
*G07C 5/08*    (2006.01)
*B60W 40/13*    (2012.01)
(Continued)

(52) U.S. Cl.
CPC ............ *B60W 40/13* (2013.01); *B60C 19/00* (2013.01); *G01G 19/08* (2013.01); *G07C 5/08* (2013.01); *B60W 2530/10* (2013.01)

(58) Field of Classification Search
CPC .......... B60C 19/00; G07C 5/08; G07C 5/008; B60W 40/13; B60W 2530/10; G01G 19/08
(Continued)

(56) References Cited

U.S. PATENT DOCUMENTS 7,616,106 B2    11/2009    Shoyama et al.
9,165,330 B2    10/2015    Ueda et al.
(Continued)

FOREIGN PATENT DOCUMENTS

CN    1825072 A    8/2006
CN    103210414 A    7/2013
(Continued)

OTHER PUBLICATIONS

RD 494056, Jun. 2005.*
International Search Report dated Dec. 3, 2013, issued for PCT/JP2013/075502.

*Primary Examiner* — Adam D Tissot
*Assistant Examiner* — Aaron C Smith
(74) *Attorney, Agent, or Firm* — Locke Lord LLP

(57) ABSTRACT

A tire management system assigns work to each of a plurality of vehicles and manages a loaded state of a tire mounted on each of the vehicles that perform the assigned work. The tire management system includes: an overload vehicle detection unit configured to detect an overload vehicle in which a tire load of the work assigned to each of the vehicles exceeds a predetermined tire load set in the tire itself of the vehicle; and a work contents changing processing unit configured to perform, when the overload vehicle is detected, processing of changing work contents of the overload vehicle such that the tire load of the overload vehicle becomes equal to or less than the predetermined tire load.

6 Claims, 9 Drawing Sheets

(51) Int. Cl.
*B60C 19/00* (2006.01)
*G01G 19/08* (2006.01)

(58) Field of Classification Search
USPC .............................................................. 701/1
See application file for complete search history.

(56) References Cited

U.S. PATENT DOCUMENTS

| | | | |
|---|---|---|---|
| 2007/0057478 A1* | 3/2007 | Shoyama | G07C 5/008 280/86.5 |
| 2010/0076640 A1* | 3/2010 | Maekawa | G05D 1/0217 701/26 |
| 2010/0094499 A1* | 4/2010 | Anderson | G05D 1/0088 701/23 |
| 2014/0244098 A1 | 8/2014 | Ueda et al. | |
| 2014/0257629 A1* | 9/2014 | Singh | B60C 23/064 701/34.4 |

FOREIGN PATENT DOCUMENTS

| | | | |
|---|---|---|---|
| CN | 203070357 U | | 7/2013 |
| JP | 04-135902 A | | 5/1992 |
| JP | 04135902 A | * | 5/1992 |
| JP | 2007-091202 A | | 4/2007 |
| JP | 2008-065753 A | | 3/2008 |
| JP | 2009-234298 A | | 10/2009 |
| JP | 2012-160085 A | | 8/2012 |

* cited by examiner

TIRE MANAGEMENT SYSTEM AND TIRE MANAGEMENT METHOD

FIELD

The present invention relates to a tire management system and a tire management method that can extend the life of a tire while minimizing the reduction in working efficiency of a vehicle.

BACKGROUND

Conventionally, at large work sites such as a rock crushing site and mine, transportation of soil is performed by running a dump truck. That is, crushed rocks are loaded on the dump truck as cargo by an excavator, a wheel loader, and the like at a loading site. The dump truck then transports the cargo to a soil discharging site via a predetermined running route, and unloads the cargo at the soil discharging site. Then, the dump truck moves to the loading site again via the predetermined running route and waits for another cargo to be loaded at the loading site. The dump truck repeatedly performs such series of work.

Among the life cycle costs of the dump truck, the ratio of the cost of the tire is high. Therefore, it is requested to extend the life of the tire and to reduce the life cycle cost.

In order to reduce the tire life cycle cost, for example, in Patent Literature 1, there are provided a sensor that measures a state of a tire mounted on each of a plurality of vehicles transporting mineral resources, and a tire information management apparatus that wirelessly receives the measured value output by the sensor. When the received measured value is not within an allowable range, the tire information management apparatus transmits, to the vehicle that has transmitted the measured value, deterioration restraint information for restraining progression of the deterioration of the tire. The deterioration restraint information is, for example, information to urge checking of the tire, information to urge reducing the loaded amount in the vehicle, or information to urge decelerating the speed of the vehicle.

In Patent Literature 2, there are provided a load sensor that measures the load on a tire or a vehicle, and a speed sensor that detects a rotational speed of the tire or a vehicle speed of the vehicle, and by using data from the sensors, the vehicle speed and the load are adjusted to extend the life of the tire.

CITATION LIST

Patent Literature

Patent Literature 1: Japanese Laid-open Patent Publication No. 2007-91202
Patent Literature 2: Japanese Laid-open Patent Publication No. 04-135902

SUMMARY

Technical Problem

However, there is a problem that working efficiency of a vehicle reduces when, as described above, a loaded amount in the vehicle is reduced or the speed of the vehicle is decelerated to extend the life of a tire.

The present invention has been made in view of the above, and an object thereof is to provide a tire management system and a tire management method that can extend the life of a tire while minimizing the reduction in working efficiency of the vehicle.

Solution to Problem

To solve the above-described problem and achieve the object, a tire management system according to the present invention assigns work to each of a plurality of vehicles, manages a loaded state of a tire mounted on each of the vehicles that perform the assigned work and includes: an overload vehicle detection unit configured to detect an overload vehicle in which a tire load of the work assigned to each of the vehicles exceeds a predetermined tire load set in the tire itself of the vehicle; and a work contents changing processing unit configured to perform, when the overload vehicle is detected, processing of changing work contents of the overload vehicle such that the tire load of the overload vehicle becomes equal to or less than the predetermined tire load.

Moreover, the tire management system according to the present invention includes an actual tire load calculation unit configured to calculate an actual tire load which is a tire load of the vehicle in actual operation based on loaded amount information and vehicle speed information notified from each of the vehicles connected wirelessly, the overload vehicle detection unit detects an overload vehicle in which an actual tire load of the work assigned to each of the vehicles exceeds the predetermined tire load, and the work contents change processing unit performs, when the overload vehicle is detected, processing of changing the work contents of the overload vehicle such that the actual tire load of the overload vehicle in actual operation becomes equal to or less than the predetermined tire load.

Moreover, the tire management system according to the present invention includes a predicted tire load calculation unit configured to calculate a predicted tire load of work in a planning stage assigned to each of the vehicles, the overload vehicle detection unit detects an overload vehicle in which the predicted tire load exceeds the predetermined tire load, and the work contents change processing unit performs, when the overload vehicle is detected, processing of changing the work contents in the planning stage of the overload vehicle such that the predicted tire load of the overload vehicle becomes equal to or less than the predetermined tire load.

Moreover, in the tire management system according to the present invention, the work contents change processing unit determines whether there is a running route in which the detected overload vehicle becomes equal to or less than the predetermined tire load, changes to such a running route when there is the running route for the detected overload vehicle to become equal to or less than the predetermined tire load, and decelerates the overload vehicle or reduces the loaded amount when there is no running route for the detected overload vehicle to become equal to or less than the predetermined tire load.

Moreover, in the tire management system according to the present invention, the tire load is a TKPH.

Moreover, a tire management method according to the present invention assigns work to each of a plurality of vehicles, manages a loaded state of a tire mounted on each of the vehicles that perform the assigned work, and includes: an overload vehicle detection step of detecting an overload vehicle in which a tire load of the work assigned to each of the vehicles exceeds a predetermined tire load set in the tire itself of the vehicle; and a work contents change processing step of performing, when the overload vehicle is detected, processing of changing work contents of the overload vehicle such that the tire load of the overload vehicle becomes equal to or less than the predetermined tire load.

Moreover, the above-described tire management method according to the present invention includes an actual tire load calculation step of calculating an actual tire load which is a tire load of the vehicle in actual operation based on loaded amount information and vehicle speed information notified from each of the vehicles connected wirelessly, the overload vehicle detection step detects an overload vehicle in which an actual tire load of the work assigned to each of the vehicles exceeds the predetermined tire load, and the work contents change processing step performs, when the overload vehicle is detected, processing of changing the work contents of the overload vehicle such that the actual tire load of the overload vehicle in actual operation becomes equal to or less than the predetermined tire load.

Moreover, the above-described tire management method according to the present invention includes a predicted tire load calculation step of calculating a predicted tire load of work in a planning stage assigned to each of the vehicles, the overload vehicle detection step detects an overload vehicle in which the predicted tire load exceeds the predetermined tire load, and the work contents change processing step performs, when the overload vehicle is detected, processing of changing the work contents in the planning stage of the overload vehicle such that the predicted tire load of the overload vehicle becomes equal to or less than the predetermined tire load.

Moreover, in the above-described tire management method according to the present invention, the work contents change processing step determines whether there is a running route in which the detected overload vehicle becomes equal to or less than the predetermined tire load, changes to such a running route when there is the running route for the detected overload vehicle to become equal to or less than the predetermined tire load, and decelerates the overload vehicle or reduces the loaded amount when there is no running route for the detected overload vehicle to become equal to or less than the predetermined tire load.

Moreover, in the above-described tire management method according to the present invention, the tire load is a TKPH.

According to the present invention, the overload vehicle detection unit detects an overload vehicle in which a tire load of work assigned to each vehicle exceeds a predetermined tire load set in the tire itself of the vehicle, and the work contents change processing unit performs, when the overload vehicle is detected, processing of changing work contents of the overload vehicle such that the tire load of the overload vehicle becomes equal to or less than the predetermined tire load. At this time, the work contents change to a running route in which the tire load becomes equal to or less than the predetermined tire load is preferentially performed. Therefore, it is possible to extend the life of the tire while minimizing the reduction in working efficiency of the vehicle.

DESCRIPTION OF EMBODIMENTS

In the following, embodiments of the present invention will be described with reference to the attached drawings.
(First Embodiment)
[Overview of System]

Figure 1:
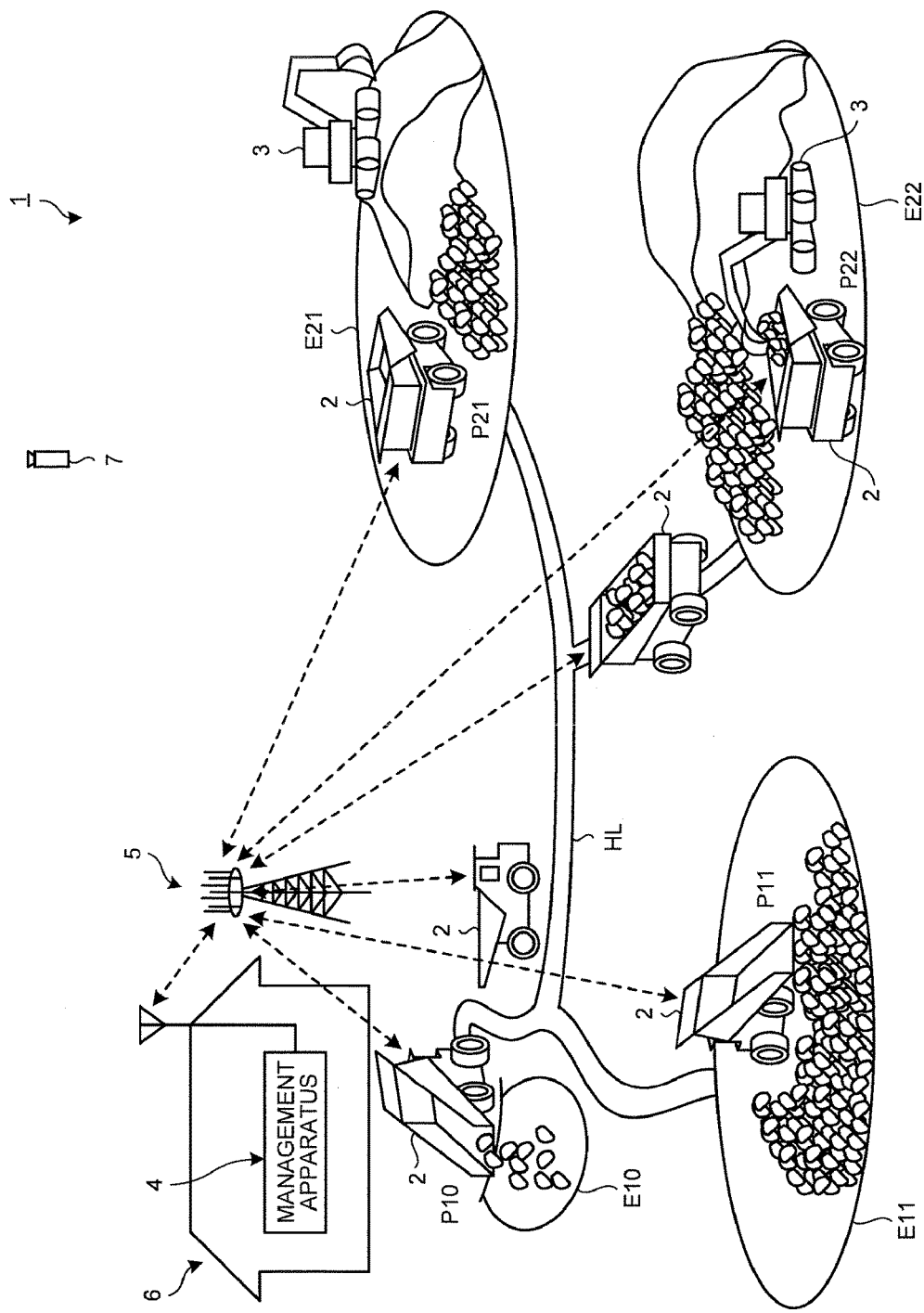
FIG. 1 is a schematic view illustrating a schematic configuration of a management system including a tire management system according to a first embodiment of the present invention.

FIG. 1 is a schematic view illustrating a schematic configuration of a management system including a tire management system according to a first embodiment of the present invention. A management system 1 is provided at a large work site such as a rock crushing site and mine, and transportation of soil, ores, and the like is performed by running a plurality of dump trucks 2. At the large work site, there are loading sites E21 and E22. A loading machine 3 is disposed at each of the loading sites E21 and E22. The loading machine 3 is capable of loading a cargo on the dump truck 2. The loading machine 3 is an excavator, an electric shovel, a wheel loader, or the like. The dump truck 2 is an example of a vehicle capable of running for transporting the cargo. The cargo is soil and ores generated by mining.

The dump truck 2 is capable of running a running path HL between the loading sites E21 and E22 and soil discharging sites E10 and E11. The dump truck 2 is loaded with the cargo at the loading sites E21 and E22. The loading sites E21 and E22 are regions in which the cargo is loaded in the mine. The dump truck 2 is loaded with the cargo at loading positions P21 and P22 of the loading sites E21 and E22. The loading machine 3 loads the cargo on the dump truck 2 located at the loading positions P21 and P22. Thereafter, the dump truck 2 moves to the objective soil discharging sites E10 and E11 via the predetermined running path HL. Then, the dump truck 2 unloads the cargo at the objective soil discharging sites E10 and E11. The soil discharging sites E10 and E11 are regions in which the cargo is discharged in the mine. The dump truck 2 discharges the cargo at soil discharging positions P10 and P11 of the soil discharging sites E10 and E11.

The management system 1 manages at least the plurality of dump trucks 2. Each dump truck 2 is an unmanned dump truck operated by a command signal from a management apparatus 4, that is, no operator is in the dump truck 2. The management apparatus 4 is disposed in a control facility 6. Between the management apparatus 4 and the dump truck 2, a wireless communication system wirelessly connecting the management apparatus 4 and the dump truck 2 via a base station 5 is formed.
[Example of Running Route Network]

Figure 2:
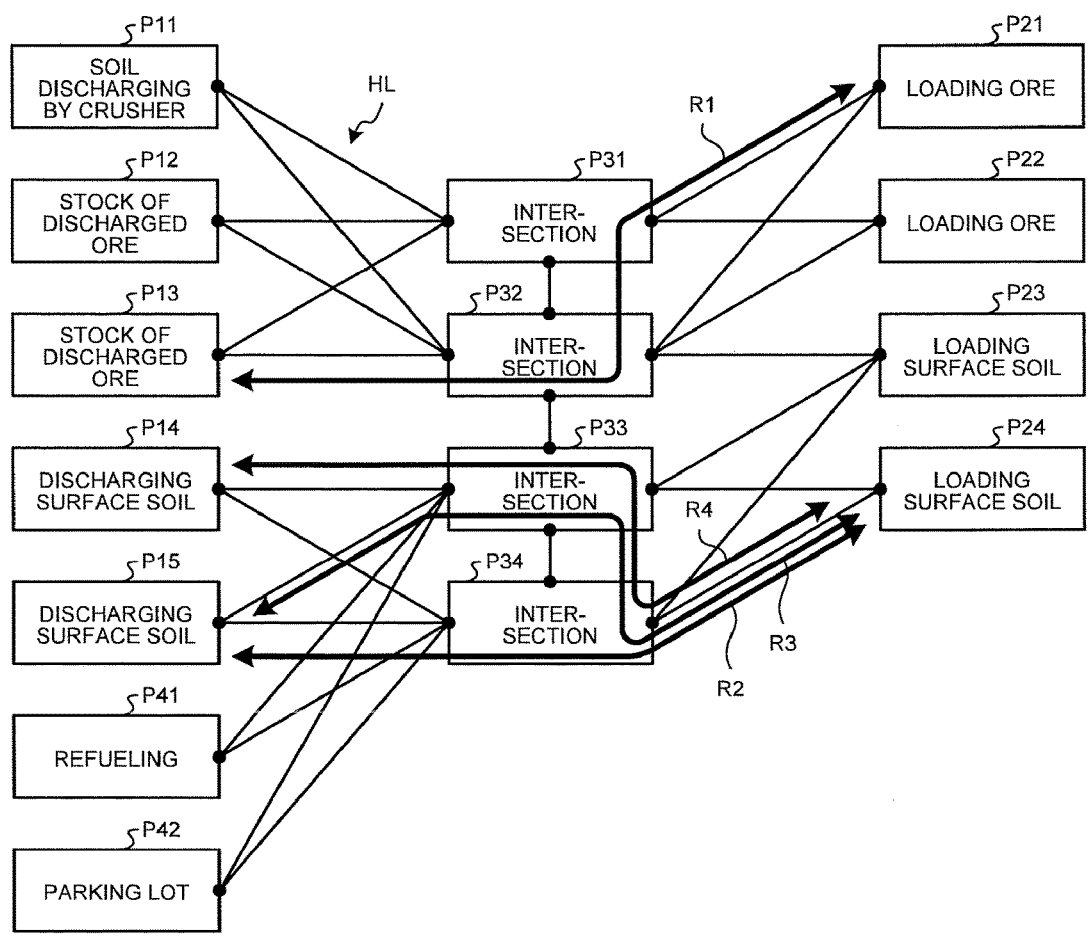
FIG. 2 is a diagram illustrating an example of a running route network stored in a running route information DB.

The dump truck 2 repeats the cycle of transporting the cargo from the loading site to the soil discharging site, discharging the cargo at the soil discharging site, and then returning to the loading site without the cargo. Work performed by the dump truck 2 includes loading of the cargo, loaded running, discharging soil, and unloaded running. A large work site, as indicated in the running route network illustrated in FIG. 2, has a plurality of loading positions P21 to P24 of the loading sites, a plurality of soil discharging positions P11 to P15 of the soil discharging sites, a plurality of intersections P31 to P34, and a plurality of running paths HL connecting between the loading positions P21 to P24, the soil discharging positions P11 to P15, and the intersections P31 to P34. In FIG. 2, the loading positions P21 and P22 are loading positions of ores, and the loading positions P23 and P24 are loading positions of surface soil. Moreover, the soil discharging position P11 is a soil discharging position for the crusher, the soil discharging positions P12 and P13 are soil discharging positions of the ores, and the soil discharging positions P14 and P15 are soil discharging positions of the surface soil. There are also a refueling position P41 and a parking lot position P42. Specific work of the dump truck 2 is, for example, work that passes through a running route R1 illustrated in FIG. 2. That is, the dump truck 2 is loaded with ores at the loading position P21 and transports the ores via the intersections P31 and P32, discharges the ores at the soil discharging position P13, and returns to the loading position P21 via the intersections P32 and P31. The dump truck 2 performs work according to the operation instruction from the management apparatus 4. The operation instruction includes information of loading sites, soil discharging sites, and running routes. The work performed by the dump truck 2 may include the running to the refueling position and the running to the parking lot position.

[Dump Truck]

Figure 3:
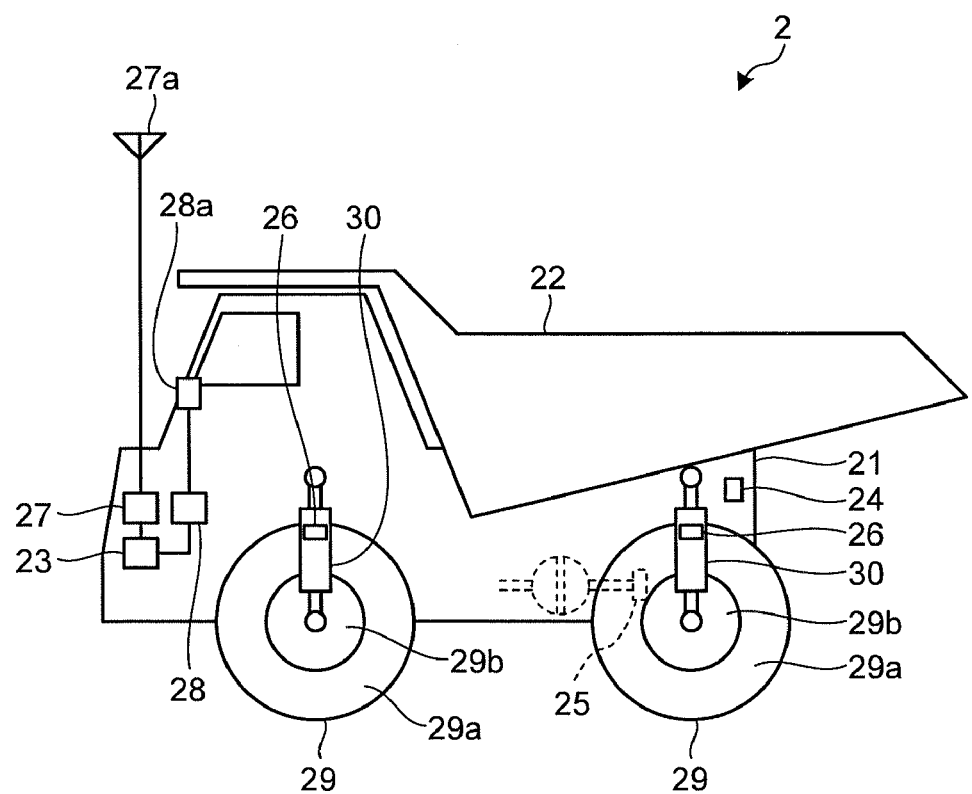
FIG. 3 is a side view illustrating a configuration of a dump truck.
Figure 4:
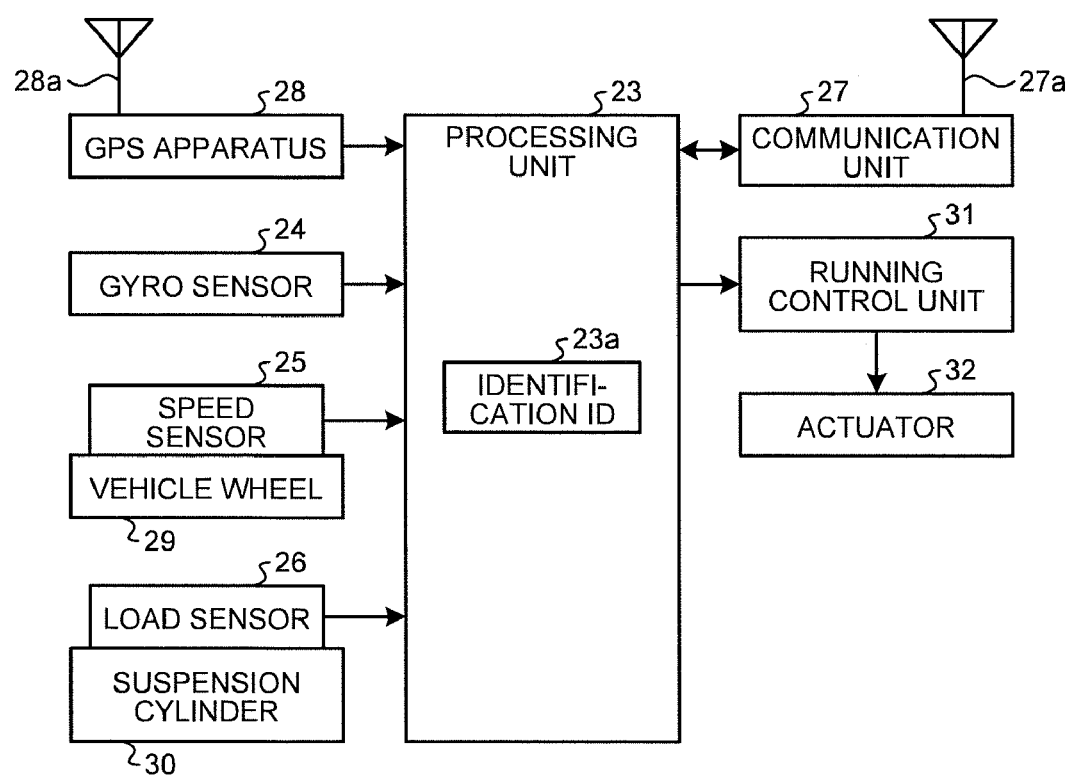
FIG. 4 is a block diagram illustrating the configuration of the dump truck.

As illustrated in FIGS. 3 and 4, the dump truck 2 has a vehicle main body 21, a vessel 22, a processing unit 23, a gyro sensor 24, a speed sensor 25, a load sensor 26, a communication unit 27 to which an antenna 27a is connected, and a GPS apparatus 28 to which an antenna 28a is connected and which detects a position of the vehicle main body 21. A driving apparatus is disposed in the vehicle main body 21. The driving apparatus includes an internal combustion engine such as a diesel engine, a generator operated by the internal combustion engine, and an electric motor operated by the power generated by the generator. A vehicle wheel 29 is driven by the electric motor. The vehicle wheel 29 is of a so-called electric driven type including a tire 29a and a wheel 29b. The vehicle wheel may be of a so-called mechanical driven type, which transmits motive power of the internal combustion engine to the vehicle wheel via a transmission including a torque converter.

The vessel 22 includes a load-carrying platform on which the cargo is loaded. The vessel 22 is disposed on top of the vehicle main body 21 so as to be swingable. The cargo is loaded into the vessel 22 by the loading machine 3. At the soil discharging time, the vessel 22 is lifted to discharge the cargo. The load sensor 26 is provided on a suspension cylinder 30 and detects the loaded amount in the vessel 22. The load sensor 26 outputs a detection signal to the processing unit 23. The processing unit 23 determines the loaded amount in the dump truck 2 based on the detection signal of the load sensor 26.

The gyro sensor 24 detects an orientation change amount of the dump truck 2. The gyro sensor 24 outputs a detection signal to the processing unit 23. The processing unit 23 can determine an orientation of the dump truck 2 based on the detection signal of the gyro sensor 24.

The speed sensor 25 detects a running speed of the dump truck 2. The speed sensor 25 detects the running speed of the dump truck 2 by detecting a rotational speed of a drive shaft of the vehicle wheel 29. The speed sensor 25 outputs a detection signal to the processing unit 23. The processing unit 23 can determine a moving distance (running distance) of the dump truck 2 based on the detection signal of the speed sensor 25 and time information from a timer (not illustrated) incorporated in the processing unit 23.

The GPS apparatus 28 detects the position of the dump truck 2 using signals from a plurality of global positioning system (GPS) satellites 7 (refer to FIG. 1). The detection signal is output to the processing unit 23.

The processing unit 23 has an identification ID 23a that identifies the dump truck 2. The processing unit 23 transmits, together with the identification ID 23a, at least vehicle position information, loaded amount information, and vehicle speed information to the management apparatus 4 via the communication unit 27.

In response, the management apparatus 4 outputs, together with the identification ID 23a, the running route and speed command to the dump truck 2 so that the dump truck 2 runs on the running route corresponding to the planned work. A running control unit 31 controls the running of the dump truck 2 by controlling driving of a corresponding actuator 32 based on the input running route and speed command.

[Management Apparatus]

Figure 5:
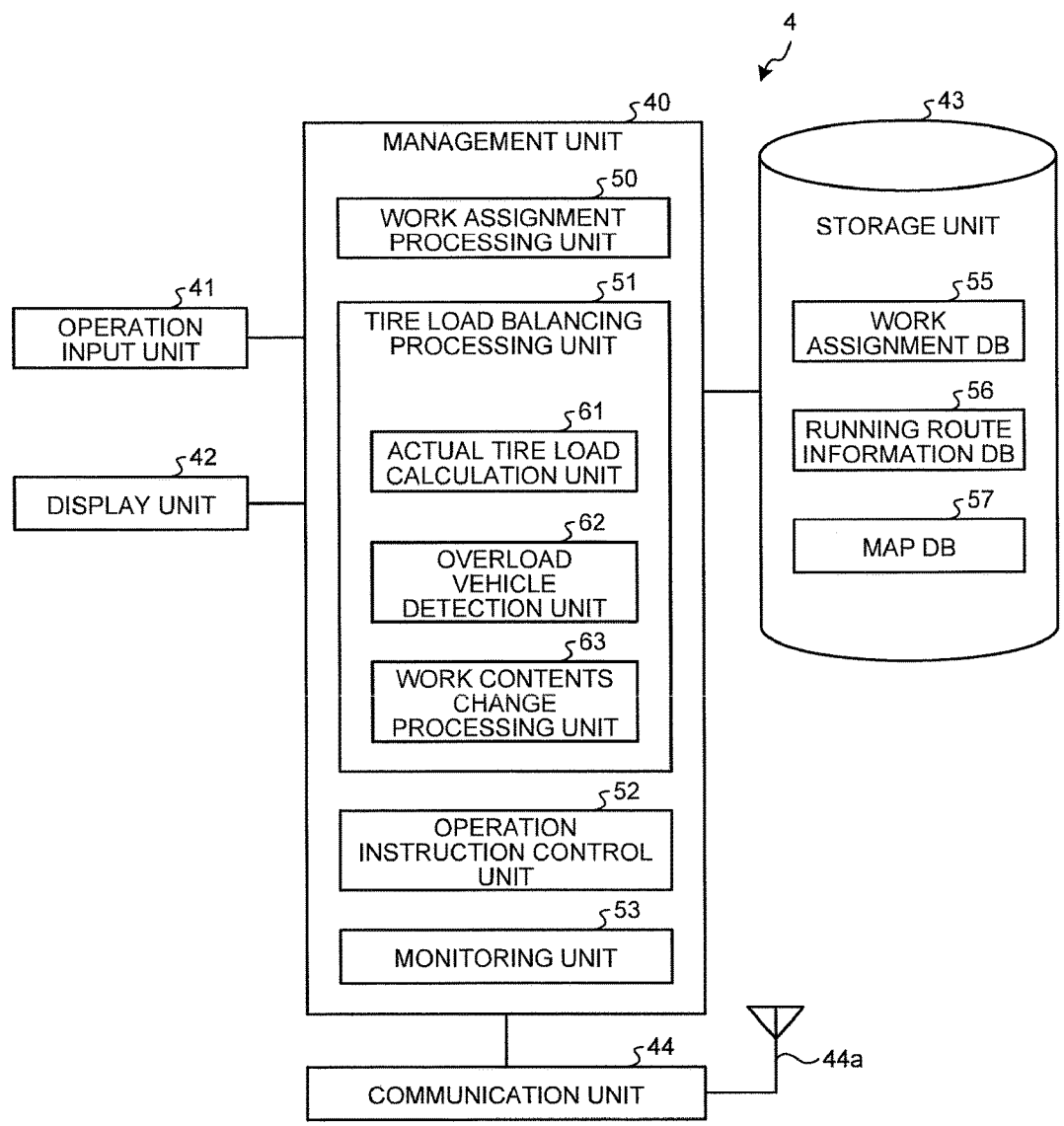
FIG. 5 is a block diagram illustrating a configuration of a management apparatus.

As illustrated in FIG. 5, the management apparatus 4 has a management unit 40, an operation input unit 41, a display unit 42, a storage unit 43, and a communication unit 44 including an antenna 44a.

The operation input unit 41 includes a keyboard, a touch panel, a mouse, and the like. The operation input unit 41 is capable of inputting an operation signal to the management unit 40. The operation input unit 41 may be a touch panel that functions also as the display unit 42.

The display unit 42 includes, for example, a flat panel display such as a liquid crystal display. The display unit 42 is capable of displaying information on the position of the dump truck 2.

The storage unit 43 has a work assignment database (DB) 55, a running route information database (DB) 56, and a map database (DB) 57. In the work assignment DB 55, for example, a plurality of work contents done in a day is described in association with each identification ID 23a of the dump truck 2. In the work contents, the loading site, the soil discharging site, and the running route are described. For each identification ID 23a of the dump truck 2, a set tire load, an actual tire load, and a predetermined tire load are described. The set tire load and the predetermined tire load are values that are set in advance. On the other hand, the actual tire load is a value updated in real time during operation of the dump truck 2.

Generally, the tire load includes a tire TKPH (Ton Km Per Hour) which is a load index set in advance to the tire itself, and a working condition TKPH which is a load index in actual work. The set tire load is the tire TKPH, the index indicating the possible work amount within the range not exceeding the limit for heat generation of the tire, and is represented by (load×speed). On the other hand, the working condition TKPH is the actual tire load, and is represented by (average applied tire load)×(average working speed). The average applied tire load is determined by:

average applied tire load=((applied tire load when vehicle is empty)+(applied tire load when vehicle is loaded))/2.

The average working speed is determined by:

average working speed=((distance of one cycle)×(number of cycles in a day))/(total working time in a day).

The applied tire load, when the vehicle is empty, is the average applied tire load obtained by dividing the load, registered in advance, of the empty dump truck 2 by the number of tires of the dump truck. Moreover, the applied tire load, when the vehicle is loaded, is the average applied tire load obtained by dividing the load of the loaded dump truck 2 determined based on the loaded amount information sent from the dump truck 2 by the number of tires of the dump truck. It is preferable to use the tire so as to satisfy set tire load>actual tire load. When used without satisfying this condition, the tire causes, for example, heat separation which shortens the tire life. The predetermined tire load is a value set in the embodiment, and is a threshold value equal to or less than the set tire load.

In the running route information DB 56, the information of the running route network illustrated in FIG. 2 is described. The information of the running route network includes each position information such as the loading position, the soil discharging position, and the intersection, and each connection relationship information. In the running route information DB 56, the vehicle speed set on each running path HL is defined.

The communication unit 44 is connected communicatively to each dump truck 2 via the antenna 44a and the base station 5.

The management unit 40 has a work assignment processing unit 50, a tire load balancing processing unit 51, an operation instruction control unit 52, and a monitoring unit 53. The work assignment processing unit 50 performs processing of creating the work assignment DB 55 of a day according to the operation input from the operation input unit 41. At that time, the actual tire load of the work assignment DB 55 is not set.

The tire load balancing processing unit 51 has an actual tire load calculation unit 61, an overload vehicle detection unit 62, and a work contents change processing unit 63. The actual tire load calculation unit 61 calculates the actual tire load of the dump truck 2 in actual operation based on the loaded amount information and the vehicle speed information notified from each dump truck 2 connected wirelessly. The overload vehicle detection unit 62 detects an overload vehicle in which the actual tire load of the work assigned to each dump truck 2 exceeds the predetermined tire load equal to or less than the set tire load of the dump truck. The work contents change processing unit 63 performs, when the overload vehicle is detected, processing of changing the work contents of each dump truck 2 so that the actual tire load in actual operation becomes equal to or less than the predetermined tire load. Detailed processing in the tire load balancing processing unit 51 will be described later.

The operation instruction control unit 52, as will be described later, outputs to each dump truck 2 an operation instruction which causes the dump truck 2 to execute the work contents described in the work assignment DB 55, and instructs the running control of the dump truck 2.

The monitoring unit 53 monitors the operating status of the dump truck 2. Furthermore, the monitoring unit 53 displays the operating status of the dump truck 2 on the display unit 42 based on the vehicle position information and the vehicle speed information transmitted from the dump truck 2. At this time, a map from the map DB 57 is displayed on the display unit 42. On the map, the running route network from the running route information DB 56, and an icon of the dump truck 2 are displayed. The icon is displayed differently between a loaded state and an unloaded state. For example, the color of a load-carrying platform is changed between the loaded state and the unloaded state. In addition, the identification ID of the dump truck is also added on the icon.

[Running Control of Dump Truck]

As described above, the management unit 40 outputs the running route and the speed command to the dump truck 2. As a result, the dump truck 2 runs on the running path HL between the loading site and the soil discharging site based on the input running route and speed command. The processing unit 23 runs the dump truck 2 according to the created running route while estimating the current position of the dump truck 2 using dead reckoning. The dead reckoning is a navigation to estimate the current position of the dump truck 2 based on the orientation and the moving distance from the origin whose latitude and longitude are known. The orientation of the dump truck 2 is detected using the gyro sensor 24 disposed in the dump truck 2. The moving distance of the dump truck 2 is detected using the speed sensor 25 disposed in the dump truck 2. The processing unit 23 outputs a steering command and a speed command to the running control unit 31 so that the dump truck 2 runs on the planned running route, based on the orientation and the moving distance of the dump truck 2.

The processing unit 23 runs the dump truck 2 while correcting the estimated position determined by the dead reckoning described above using the GPS apparatus 28. When the running distance of the dump truck 2 gets longer, an error between the estimated position and the actual position occurs due to the accumulation of the detection error of the gyro sensor 24 and the speed sensor 25. As a result, there is a possibility that the dump truck 2 runs deviating from the running route. Therefore, the processing unit 23 runs the dump truck 2 while making corrections using the position information of the dump truck 2 detected by the GPS apparatus 28.

[Tire Load Balancing Processing]

The tire load balancing processing procedure by the tire load balancing processing unit 51 will be described with reference to the flowchart illustrated in FIG. 6. The processing is repeatedly performed at predetermined intervals.

Figure 6:
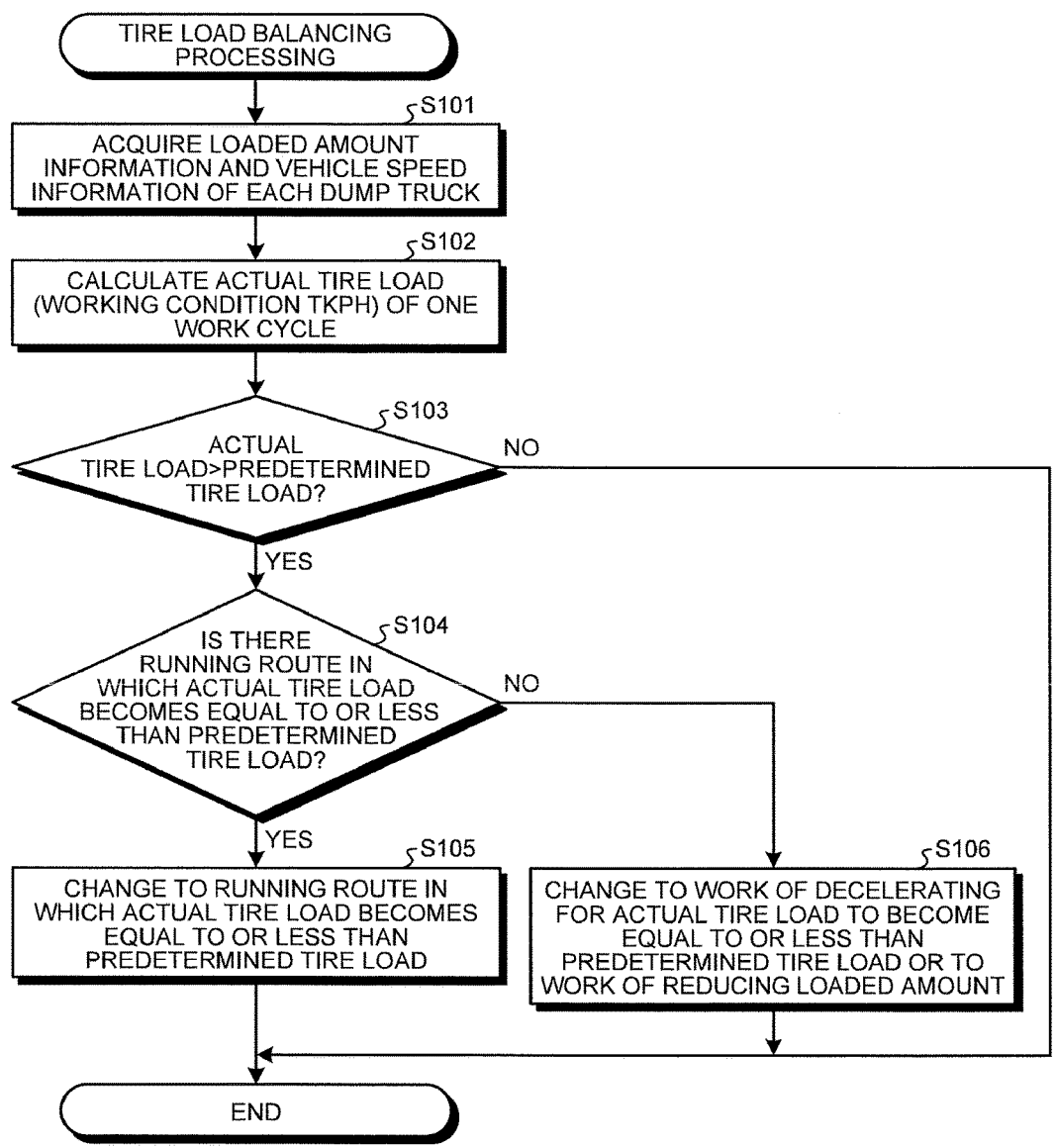
FIG. 6 is a flowchart illustrating a tire load balancing processing procedure by a tire load balancing processing unit.

In FIG. 6, first, the actual tire load calculation unit 61 acquires the loaded amount information and the vehicle speed information of each dump truck 2 (step S101). Then, the actual tire load calculation unit 61 calculates the actual tire load of one work cycle (step S102). After that, the overload vehicle detection unit 62 determines whether the actual tire load calculated by the actual tire load calculation unit 61 exceeds the predetermined tire load (step S103). When the actual tire load does not exceed the predetermined tire load (step S103, No), the work contents change processing unit 63 ends the present processing. In step S102, the actual tire load of one work cycle is calculated. Alternatively, however, the actual tire loads of a plurality of work cycles may be calculated.

On the other hand, when the actual tire load exceeds the predetermined tire load (step S103, Yes), the work contents change processing unit 63 determines whether there is a running route in which the actual tire load becomes equal to or less than the predetermined tire load (step S104). When there is a running route in which the actual tire load becomes equal to or less than the predetermined tire load (step S104, Yes), the work contents change processing unit 63 performs processing of changing the work contents of the target dump truck 2 to the running route in which the actual tire load becomes equal to or less than the predetermined tire load (step S105), and ends the present processing.

On the other hand, when there is no running route in which the actual tire load becomes equal to or less than the predetermined tire load (step S104, No), the work contents change processing unit 63 performs processing of changing the work contents of the target dump truck 2 to the work of decelerating for the actual tire load to become equal to or less than the predetermined tire load, or to the work of reducing the loaded amount (step S106), and ends the present processing.

In step S104, the determination as to whether there is a running route in which the actual tire load becomes equal to or less than the predetermined tire load is performed so as to suppress the reduction in working efficiency of the dump truck 2 by preferentially performing a work change of only changing the running route.

As illustrated in FIG. 2, in a case where the current running route is defined as R2 by the loading position P24, the intersection P34, and the soil discharging position P15, the work change of only the running route includes, for example, a case where the current running route is changed to a new running route R3 that passes through the intersections P34 and P33 without changing the loading position P24 and the soil discharging position P15, and a case where the current running route is changed to a running route R4 where the soil discharging position P15 is changed to the soil discharging position P14.

Figure 7:
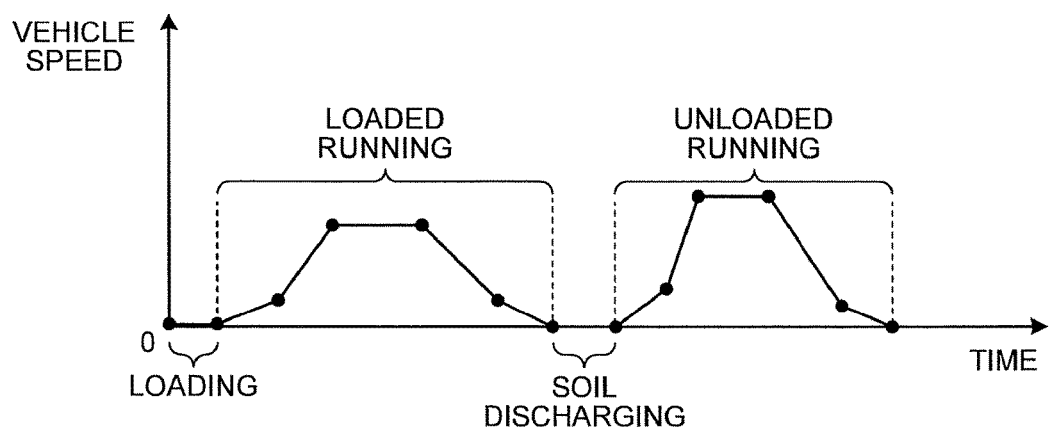
FIG. 7 is a time chart illustrating exemplary work of one cycle.

As illustrated in FIG. 7, the work of one cycle that passes through the running route includes a loading process, a loaded running process, a soil discharging process, and an unloaded running process. There are some running routes in which the vehicle speed is low in a loaded running process and an unloaded running process, and it is possible to reduce the actual tire load by changing to such a running route in which a low vehicle speed applies. Moreover, since there are a loading position and a soil discharging position where the waiting time is long in the loading process and the soil discharging process, it is possible to reduce the actual tire load by changing to a running route including the loading position and the soil discharging position with long waiting time.

The work change by step S106 is for decelerating the vehicle speed of the dump truck 2 itself or reducing the loaded amount without changing the running route.

The tire load balancing processing unit 51 extends the life of the tire overall by balancing the tire load of each work while minimizing the reduction in work efficiency by, as described above, performing the work contents change of changing the running route.

Figure 8:
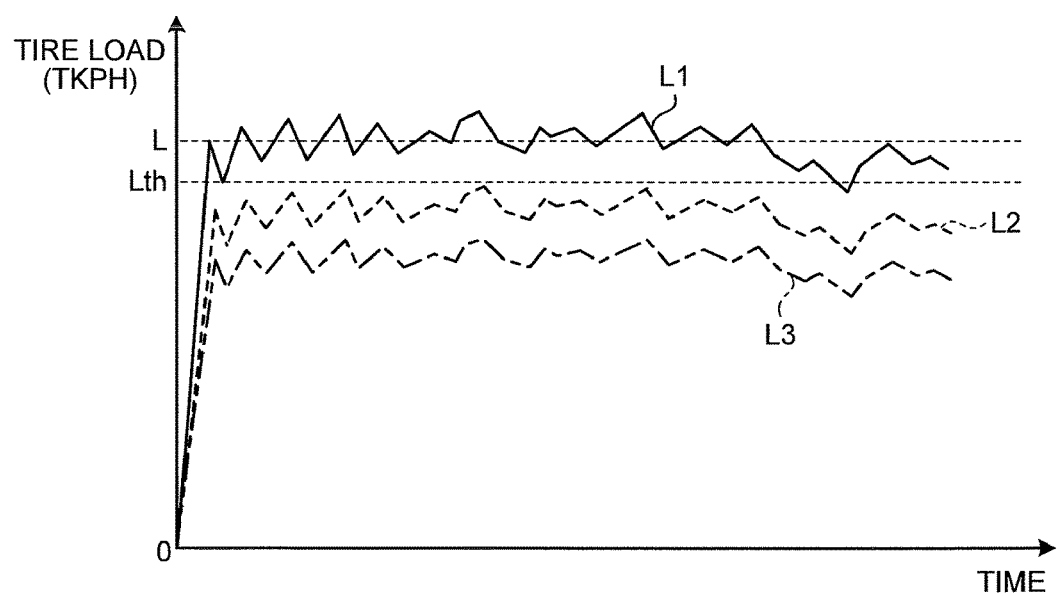
FIG. 8 is a diagram illustrating a change over time of an actual tire load of the dump truck.

Therefore, as illustrated in FIG. 8, work that indicates an actual tire load characteristic L1 that exceeds a set tire load L is reduced, and the work is changed to work in which the actual tire load becomes equal to or less than the predetermined tire load Lth like actual tire load characteristics L2 and L3. As a result, the tire load of the work is balanced, thereby extending the life of the tire overall.

The actual tire load calculation unit 61 described above may be provided in the dump truck 2 and configured to transmit the calculation result to the management apparatus 4.

(Second Embodiment)

Figure 9:
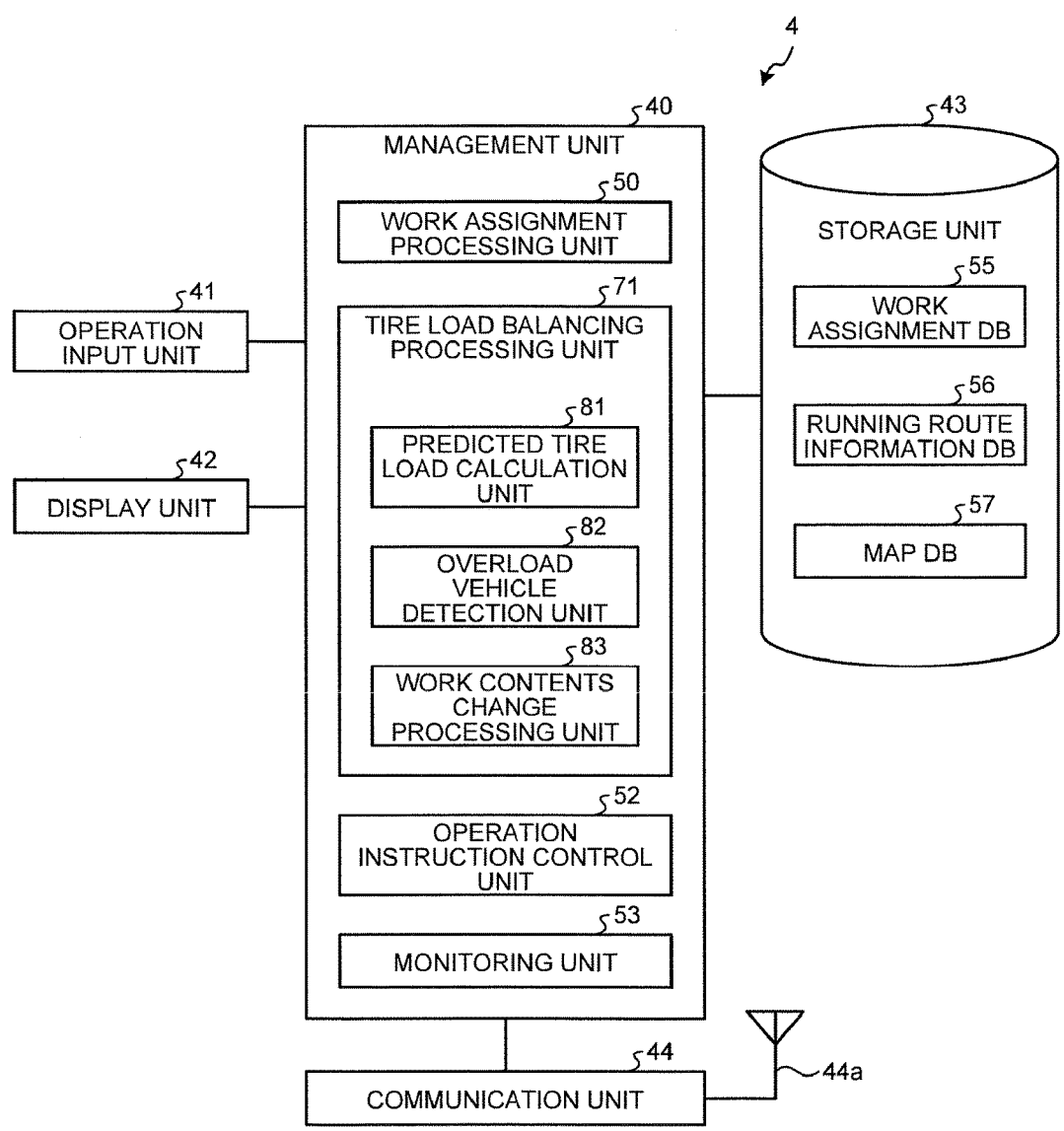
FIG. 9 is a block diagram illustrating a configuration of a management apparatus according to a second embodiment.

FIG. 9 is a block diagram illustrating a configuration of a management apparatus 4 of a tire management system according to a second embodiment of the present invention. According to the first embodiment described above, the work contents are changed by detecting the actual tire load in real time. In the second embodiment, however, a predicted tire load is calculated in the planning stage and the tire load of the work is balanced in the planning stage.

The management apparatus 4 illustrated in FIG. 9 is provided with a tire load balancing processing unit 71 instead of the tire load balancing processing unit 51 illustrated in FIG. 5. The other configuration is the same as that in the first embodiment. The tire load balancing processing unit 71 has a predicted tire load calculation unit 81, an overload vehicle detection unit 82, and a work contents change processing unit 83.

The predicted tire load calculation unit 81 calculates a predicted tire load of the work in the planning stage assigned to each dump truck. The overload vehicle detection unit 82, with reference to a work assignment DB 55, detects an overload vehicle in which the predicted tire load exceeds a predetermined tire load equal to or less than a set tire load set to the tire itself of each dump truck 2. The work contents change processing unit 83 performs, when the overload vehicle is detected, processing of changing the work contents in the planning stage of each dump truck 2 so that the predicted tire load of the overload vehicle becomes equal to or less than the predetermined tire load.

[Tire Load Balancing Processing in Planning Stage]

The tire load balancing processing procedure by the tire load balancing processing unit 71 will be described with reference to the flowchart illustrated in FIG. 10. The processing is repeatedly performed at predetermined intervals.

Figure 10:
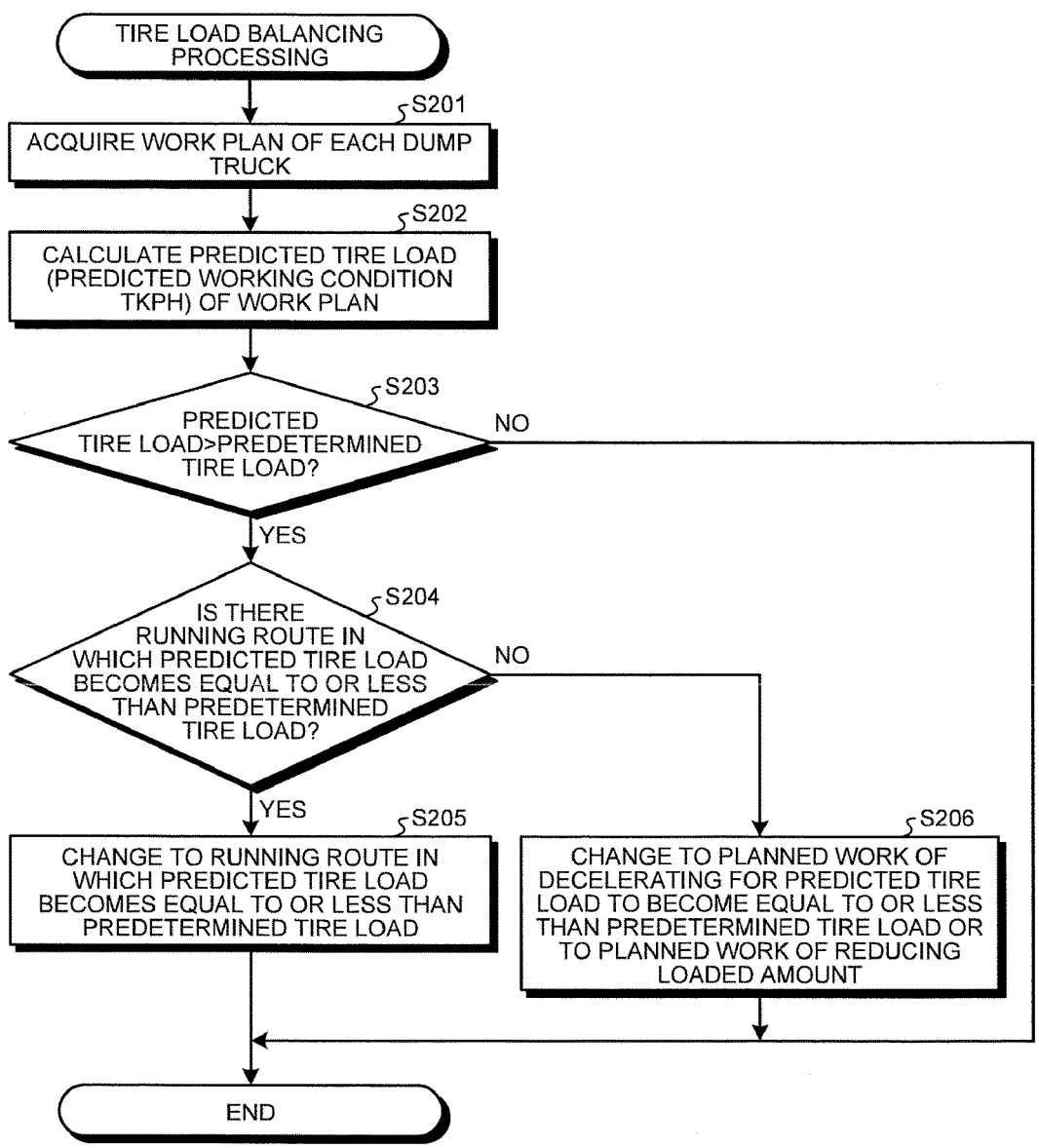
FIG. 10 is a flowchart illustrating a tire load balancing processing procedure by a tire load balancing processing unit illustrated in FIG. 9.

In FIG. 10, first, the predicted tire load calculation unit 81 acquires planned work at the planning stage of each dump truck 2 from the work assignment DB 55 (step S201). Then, the predicted tire load calculation unit 81 calculates a predicted tire load of the planned work (step S202).

The predicted tire load (predicted working condition TKPH) is determined by:

predicted tire load=(predicted applied tire load)× (predicted working speed).

The predicted applied tire load is determined by:

predicted applied tire load=((applied tire load when vehicle is empty)+(applied tire load when vehicle is loaded))/2.

As described above, the applied tire load, when the vehicle is empty, is the average applied tire load obtained by dividing the load of the empty dump truck 2 registered in advance by the number of tires of the dump truck. Moreover, the applied tire load, when the vehicle is loaded, is the average applied tire load obtained by dividing the load of the loaded dump truck 2 determined based on the loaded amount information sent from the dump truck 2 by the number of tires of the dump truck.

Meanwhile, a predicted working speed can be determined based on an interval vehicle speed which is registered in advance for each running path HL in the running route information DB 56. The predicted working speed may be determined based on a designated speed (speed command) to the dump truck 2 calculated based on running route three dimensional information of the running route information DB 56. The designated speed is determined by using tilt information, curvature information, swing acceleration limit, and the like of the running path HL. The predicted working speed may be obtained by predicting the interval speed information based on past dump truck running record information of the running route.

Then, the overload vehicle detection unit 82 determines whether the predicted tire load calculated by the predicted tire load calculation unit 81 exceeds the predetermined tire load (step S203). After that, when the predicted tire load does not exceed the predetermined tire load (step S203, No), the work contents change processing unit 83 ends the present processing.

On the other hand, when the predicted tire load exceeds the predetermined tire load (step S203, Yes), the work contents change processing unit 83 determines whether there is a running route in which the predicted tire load becomes equal to or less than the predetermined tire load (step S204). When there is a running route in which the predicted tire load becomes equal to or less than the predetermined tire load (step S204, Yes), the work contents change processing unit 83 performs processing of changing the planned work contents of the target dump truck 2 to the running route in which the predicted tire load becomes equal to or less than the predetermined tire load (step S205), and ends the present processing.

On the other hand, when there is no running route in which the predicted tire load becomes equal to or less than the predetermined tire load (step S204, No), the work contents change processing unit 83 performs processing of changing the planned work contents of the target dump truck 2 to the planned work of decelerating for the predicted tire load to become equal to or less than the predetermined tire load, or to the planned work of reducing the loaded amount (step S206), and ends the present processing.

In the second embodiment, similar to the first embodiment, in step S204, the determination as to whether there is a running route in which the predicted tire load becomes equal to or less than the predetermined tire load is performed so as to suppress the reduction in working efficiency of the dump truck 2 by preferentially performing a work change of only changing the running route.

In the second embodiment, since the tire load balancing of the work is performed before the actual operation of the dump truck 2, it is possible to extend the life of the tire while suppressing the reduction in working efficiency immediately after the start of the actual operation. In the second embodiment, the tire load balancing processing in real time may be performed similar to the processing in the first embodiment.

It should be noted that in the first and second embodiments described above, the predetermined tire load is preferably set at a predetermined ratio of the tire load (tire TKPH) of each dump truck. In addition, the predetermined tire load is preferably provided on each vehicle such as the dump truck 2. Furthermore, in the second embodiment, a large predetermined tire load is set in advance, and when the predicted tire load does not exceed the predetermined tire load, it is preferable that the predetermined tire load be lowered sequentially, and the work contents change to the planned work with the highest predicted tire load be preferentially performed. As a result, the tire load balancing processing which further extends the life of the tire can be reliably performed.

In the first and second embodiments described above, an unmanned dump truck has been described as an example of a transporting vehicle, but also a manned dump truck can be applied. In a case of a manned dump truck, the operation instruction such as work contents change is displayed on a display unit of the manned dump truck, so that the operator of the manned dump truck is notified to the operation instruction.

In addition, the wireless communication system between the management apparatus 4 serving as a master station and each dump truck 2 serving as a slave station is connected to the base station 5. Alternatively, the wireless communication system may be a wireless ad hoc network system not using any base station 5, that is, an autonomous decentralized wireless network system. In such case, it is preferable that a similar function to that of the management apparatus 4 serving as the master station be mounted in one dump truck 2. By performing vehicle-to-vehicle communication between the dump trucks 2, the wireless communication system with a simple configuration can be realized. The vehicle-to-vehicle communication may be realized through a system in which the dump trucks 2 communicate with each other, or may be realized by communicatively connecting the dump trucks 2 by creating a simple wireless area on the roadside.

REFERENCE SIGNS LIST

1 Management system
2 Dump truck
3 Loading machine
4 Management apparatus
5 Base station
6 Control facility
7 GPS satellite
21 Vehicle main body
22 Vessel
23 Processing unit
23a Identification ID
24 Gyro sensor
25 Speed sensor
26 Load sensor
27a,28a,44a Antenna
27,44 Communication unit
28 GPS apparatus
29 Vehicle wheel
29a Tire
29b Wheel
30 Suspension cylinder
31 Running control unit
32 Actuator
40 Management Unit
41 Operation input unit
42 Display unit
43 Storage unit
50 Work assignment processing unit
51,71 Tire load balancing processing unit
52 Operation instruction control unit
53 Monitoring unit
61 Actual tire load calculation unit
62,82 Overload vehicle detection unit
63,83 Work contents change processing unit
81 Predicted tire load calculation unit
55 Work assignment DB
56 Running route information DB
57 Map DB
R1 to R4 Running route

The invention claimed is:

1. A tire management system that assigns work to each of a plurality of vehicles and manages a loaded state of a tire mounted on each of the vehicles that perform the assigned work, the tire management system comprising:

an overload vehicle detection unit configured to detect an overload vehicle in which a tire load of the work assigned to each of the vehicles exceeds a predetermined tire load set in the tire itself of the vehicle;

a work contents changing processing unit configured to perform, when the overload vehicle is detected, processing of changing work contents of the overload vehicle such that the tire load of the overload vehicle becomes equal to or less than the predetermined tire load; and a predicted tire load calculation unit configured to obtain a planned work at a planning stage, the planned work being assigned to each of the vehicles, the planning stage being a stage before each of the vehicles starts the assigned planned work, and calculate a predicted tire load of the planned work in the planning stage assigned to each of the vehicles, wherein the overload vehicle detection unit detects an overload vehicle in which the predicted tire load exceeds the predetermined tire load, and the work contents change processing unit performs, when the overload vehicle is detected, processing of changing the work contents in the planning stage of the overload vehicle such that the predicted tire load of the overload vehicle becomes equal to or less than the predetermined tire load.

2. The tire management system according to claim 1, wherein the work contents change processing unit determines whether there is a running route in which the tire load of the detected overload vehicle becomes equal to or greater than the predetermined tire load, and in response to detecting that the detected over load vehicle is equal to or greater than the predetermined tire load, the work content change processor changes to such a running route when there is the running route for the detected overload vehicle to become equal to or less than the predetermined tire load, and decelerates the overload vehicle or reduces the loaded amount when there is no running route for the detected overload vehicle to become equal to or less than the predetermined tire load.

3. The tire management system according to claim 1, wherein the tire load includes a load index which is expressed as a Ton Kilometer Per Hour (TKPH).

4. A tire management method for assigning work to each of a plurality of vehicles and managing a loaded state of a tire mounted on each of the vehicles that perform the assigned work, the tire management method comprising:

an overload vehicle detection step of detecting an overload vehicle in which a tire load of the work assigned to each of the vehicles exceeds a predetermined tire load set in the tire itself of the vehicle;

a work contents change processing step of performing, when the overload vehicle is detected, processing of changing work contents of the overload vehicle such that the tire load of the overload vehicle becomes equal to or less than the predetermined tire load; and a predicted tire load calculation step of obtaining a planned work at a planning stage, the planned work being assigned to each of the vehicles, the planning stage being a stage before each of the vehicles starts the assigned planned work, and calculating a predicted tire load of the planned work in the planning stage assigned to each of the vehicles, wherein the overload vehicle detection step detects an overload vehicle in which the predicted tire load exceeds the predetermined tire load, and the work contents change processing step performs, when the overload vehicle is detected, processing of changing the work contents in the planning stage of the overload vehicle such that the predicted tire load of the overload vehicle becomes equal to or less than the predetermined tire load.

5. The tire management method according to claim 4, wherein the work contents change processing step determines whether there is a running route in which the tire load of the detected overload vehicle becomes equal to or greater than the predetermined tire load, and in response to detecting that the detected over load vehicle is equal to or greater than the predetermined tire load, the work content change processor, changes to such a running route when there is the running route for the detected overload vehicle to become equal to or less than the predetermined tire load, and decelerates the overload vehicle or reduces the loaded amount when there is no running route for the detected overload vehicle to become equal to or less than the predetermined tire load.

6. The tire management method according to claim 4, wherein the tire load includes a load index which is expressed as a Ton Kilometer Per Hour (TKPH).

* * * * *